May 6, 1952     T. B. JONES     2,595,947
TROLLING FLOAT
Filed Dec. 29, 1947
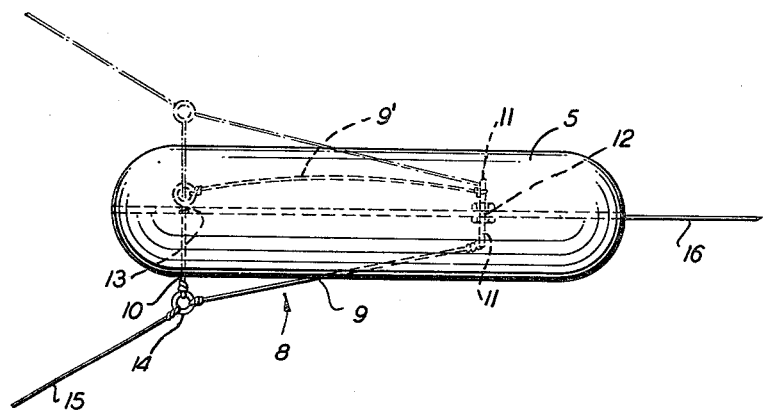
Fig. 1
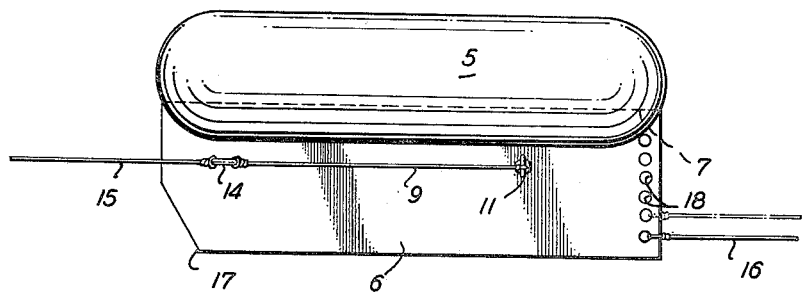
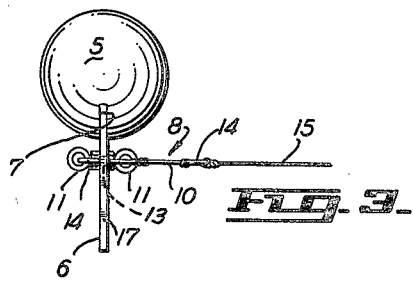
Fig. 2
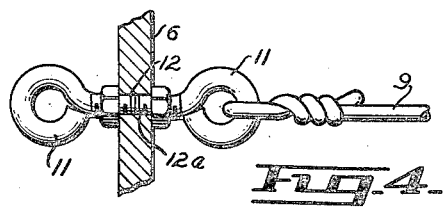
Fig. 3     Fig. 4
INVENTOR.
THOMAS B. JONES
BY
*Westall & Westall*
ATTORNEYS

Patented May 6, 1952

2,595,947

UNITED STATES PATENT OFFICE 2,595,947

TROLLING FLOAT

Thomas B. Jones, Banning, Calif.

Application December 29, 1947, Serial No. 794,316

3 Claims. (Cl. 43—43.13)

This invention relates to trolling floats, and more specifically contemplates a fishing device for trailing a lure from a boat or from the shore in a direction oblique with respect to the direction of movement of the angler or flow of the stream.

A general object of the invention is to provide a float comprising a body and a depending keel plate adapted to be trailed through the water by a hand line attached to one side of the device by a bridle operable to normally maintain the body and keel at a predetermined angle to the lead line, the action of the keel plate upon the water being effective to compel movement of the float into the stream or lake in, selectively, a forward or lateral direction depending upon the manipulation of the lead line.

It has been found that the efficacy of devices of the type referred to depends primarily upon the balance attained incident to the weight and disposition of the keel plate and the arrangement of the bridle with respect to the submerged surface area of the assembly at the corresponding side thereof so as to obtain maximum utility of the weight and said area in resisting lateral movement of the device through the water in response to tension upon the lead line. In an effort to attain this object and minimize tilting of the float in the water, it is common practice to provide a three line bridle, two of which lines are connected at spaced points on the body of the float and the other being attached to the keel. This arrangement, while being normally adapted to maintain the preadjusted relationship of the float and hand line and to obviate tilting of the keel and the loss of efficiency resulting therefrom is objectionable, due to the depth of the lower line of the bridle which tends to become entangled with weeds or other underwater growth.

It is a principal object of the present invention to provide a trolling device of the character above alluded to having a bridle comprising two lines attached to the keel plate at points equispaced between the upper and lower extremities of the effective submerged portion of the device, so as to maintain the vertical balance of the float as opposed to the lateral pressure of the water thereagainst.

Another and closely related object is to provide a composite keel and body assembly of a form which assures maximum lateral surface area and minimum draft with the horizontal line equally dividing the normally submerged surface at each side thereof at a level only slightly below the surface of the water so as to minimize the tendency of the bridle or either line thereof to engage submerged objects.

Still another and highly important object is the provision of a bridle intermediate the ends of the device, whereby the lengths of the component lines are materially reduced, in combination with a dual forward bridle attachment transversely reciprocable through the assembly for connection to a hand line at either side of the device depending upon the direction of its proposed movement through the water, the attachment being adapted to determine the lateral extension of the bridle and thereby maintain the requisite angular relationship between the hand line and the longitudinal axis of the float.

Another object is to provide a keel plate formed at its forward end to enable the float to ride over submerged objects and carrying at its opposite end a plurality of means for the attachment of a leader or line to which a lure may be connected, said means being vertically spaced at the back of the keel whereby the lure may be trailed just below the surface at any of various depths.

Other objects and salient advantages of my invention, such for example as simplicity of construction, facility of assembly, economy of manufacture, accuracy of direction and ease of control in both flowing and still waters and compactness, will be apparent to those of skill in the art upon an examination of the following description read in the light of the accompanying drawings, in which:

Fig. 1 is a top plan view of a device incorporating my invention, with dotted and solid lines indicating the attachment of the hand line to opposite sides, respectively, of the device;

Fig. 2 is a side elevation of the float;

Fig. 3 is a front elevation of the assembly illustrated in Figs. 1 and 2.

Fig. 4 is a vertical section through the keel plate which is shown partially broken away, taken at the rear anchoring point of the bridle.

Referring to the drawings more in detail, the numerals of which indicate similar parts throughout the several views, 5 designates the body of the float which in the present embodiment is solid and may be composed of wood, cork or other material substantially lighter than water, but may be hollow and composed of a suitable plastic. Body 5 is symmetrical about both its longitudinal and transverse axes, being preferably round in cross-section and uniformly rounded at opposite ends.

Comprising a part of the float is an elongated flat keel plate 6, generally rectangular in plan, and composed preferably of sheet metal is fitted into a slot 7 in one side of the body, extending parallel with the longitudinal axis of the latter. The lower edge of the rectangular keel plate 6 is straight and parallel to the longitudinal axis of the body so as to combine maximum surface area with a minimum draft. The forward end of the keel plate is cut away obliquely as at 17 to enable the float to ride over submerged objects.

The bride assembly 8 comprises a pair of lines 9 and 9' and a line 10 adapted to be tied, hooked or otherwise attached to hooks, eyes or the like carried by keel plate 6, as about to be described. The rearward attaching mediums for the lines 9 and 9' of the bridle 8 at opposite sides of the body 5 comprise a pair of eyes or rings 11 suitably secured to the opposite ends of a shank 12, threaded as at 12a, extending through keel plate 6 directly below and adjacent the body intermediate the middle of the assembly and the stern end of the body.

The forward section of the bridle 8 comprises a shorter line 10 which extends transversely and loosely through a hole 13 located in keel plate 6 forward of the middle of the body and in horizontal alignment with the eyes 11. Attached to each end of line 10 is a ring 14 of a diameter larger than hole 13 in the keel plate so as to prevent complete withdrawal of line 10 from the plate, each ring 14 limiting the lateral extension of the other ring 14 from the plate 6. The forward ends of lines 9 and 9' are attached by tying or otherwise to the rings 14, respectively, at corresponding sides, respectively, of the body, each line being of a length to extend tautly between the rings 11 and 14 projecting from the same side, respectively, of the body when the forward transverse line 10 is fully extended from the keel plate 6 and forming a right angle with the longitudinal axis of the assembly.

A hand line 15 is attached by tying to the forward ring 14 at each side of the device depending upon the direction in which the latter is to be moved. The length of the transverse line 10 of the bridle 8 is such to place the ring 14 to which the hand line 15 is attached in a position whereby the hand line and rearwardly-projecting line 9 or 9' of the bridle forms a straight angle when the device is in use.

Below the stern end of the body the keel plate is provided with a plurality of holes 18 vertically aligned and equi-spaced apart, extending from adjacent the body to adjacent the lower edge of the plate, in any of which holes a trailing line 16 may be tied or otherwise attached. A lure (not shown) secured to the end of the line 16 is thus drawn through the water, in accordance with the operation as hereinafter described, at any desired distance behind the float and below the surface at a level depending upon the location of the particular hole 18 in which the trailing line 16 is attached.

The operation and utility of the float is further briefly described as follows: Where a number of fishermen are trolling from the same boat, it is desirable that each be assigned a definite area of the water in which to confine his lure. However, with the lines trailing the boat, in the absence of means for their lateral direction, there is a possibility of entanglement, particularly after a strike is made. The device of my invention may be effectively employed to divert and maintain the lines of each of several anglers in laterally-spaced areas. For example, if it is desirable to direct the line of a particular angler seated at the port side of the boat, it is necessary that the lure be moved in the water from left to right of the angler so as to trail the corresponding side of the boat. Accordingly, the lead or hand line 15 of the tackle is attached to the forward ring 14 at the starboard side of the float, and the line 16 carrying the lure (not shown) is secured to the keel plate 6 of the device, whereupon the assembly is placed in the water. The angler then feeds out the hand line 15 at a speed somewhat less than the speed of the boat so as to exert a tension upon the bridle 8 and thereby maintain a constant angle between the hand line 15 and longitudinal axis of the float which closely approximates the angle between the rearwardly-directing line 9 or 9' of the bridle 8 and the body 5 of the float. It will be appreciated that tension upon the line 15 as the latter is fed out will continuously tend to draw the float through the water in a direction oblique to the direction of movement of the boat. The float is thus permitted to trail the boat at a progressively increasing distance until it has been determined that sufficient line has been released. Thereafter the resistance of the submerged surface area of the body 5 and keel plate 6 to lateral movement through the water impels the float forwardly in an arc having a center in the boat so as to gradually decrease the angle between the direction of movement of the boat and that of the float. The lateral distance to which the float and attached lure may be moved is thus determined only by the length of the hand line 15 fed out and the friction of the line in the water which tends to reduce efficiency. Conversely, lateral displacement of the float from the line of movement of the boat may be checked at any distance and the float drawn along at the same speed as, and in a direction parallel to that of the movement of, the boat.

In order to trail the float from the opposite side of the boat, the lead or hand line 15 is detached from the ring 14 of the starboard side of the device and engaged with the ring 14 at the port side. Tension upon the line 15 is effective to draw the transverse line 10 of the bridle 8 through the hole 13 in the keel plate 6 and fully extend the bridle.

The float may be effectively used from the shore of a lake or stream in a similar manner. The hand line 15 is connected to the forward ring 14 at one side or the other of the bridle, depending upon the direction of proposed movement of the device and the latter then deposited in the water. In still water the angler then walks along the shore in the direction toward which the bow of the float is directed, until sufficient line is fed out to carry the device from the shore the distance desired, whereupon the line 15 is drawn taut as the angler continues to walk forwardly. The device will, by reason of the resistance of the water against this lateral movement, swing outwardly from the shore at an initial angle corresponding to the angle between the longitudinal axis of the body and the shore line, but this angle will immediately and progressively decrease until the device is moving substantially parallel to the shore line. It will be appreciated that this result may be achieved in a flowing stream without movement of the angler, the force of the water flowing against the lower portion of the body 5 and keel plate 6 being effective to arcuately divert the float.

Due to the location of the bridle attachment 8 to the keel plate 6 equi-spaced between the upper and lower extremities of the submerged effective surface of the assembly, only two bridle lines are necessary at each side of the device, the pressure of the water against the body and keel being equally divided above and below the bridle, whereby the tendency of the device to tilt or roll will be minimized.

While I have shown and described but one embodiment of my invention, it will be appreciated that numerous changes in size, design, shape and number of the various parts may be made, that the proportion indicated between the lengths of the bridle lines and corresponding dimensions of that of the body and keel plate, while having been found to be satisfactory, may be changed to meet specific circumstances, and similarly the lower edge of the keel plate may be arcuate to more readily enable the float to ride over submerged obstructions, without departing from the spirit of my invention as defined in the appended claims.

What I claim and desire to secure by Letters Patent is:

1. In a device of the character described, a float comprising an elongated buoyant body and a keel plate having a hole therein, secured to and depending from the underside of said body, a bridle comprising a line extending loosely through said hole and connected to opposite sides, respectively, of said keel plate at points rearwardly of said hole, and a hand line connected to said bridle.

2. In a device of the character described, a float comprising an elongated body and a flat keel plate of a length substantially corresponding to the length of the body, said body having a slot therein for the reception of said keel plate, said keel plate extending into said slot and substantially filling the ends of said slot, a bridle comprising line means having its ends attached to opposite sides, respectively, of the keel plate adjacent the stern on a horizontal plane dividing the vertical dimension of the submerged portion of the float, said keel plate having a hole therein horizontally aligned with the points of attachment of the end portions of said line means, an intermediate portion of said line extending loosely through said hole, a hand line, means carried by said bridle line means at opposite sides of said float for attachment of said hand line, a trailing line, and a plurality of vertically-spaced means of attachment for said trailing line at the stern of said keel plate.

3. In a device of the character described, a float provided with a keel, a bridle comprising a transverse line extending reciprocably through said keel, at a point in a plane horizontally and substantially equally dividing the submerged keel, for extension, selectively, from either side of said float, a pair of retaining lines connected to the ends, respectively, of said transverse line and keel at points rearwardly of said transverse line, and a hand line connected to one end of said transverse line.

THOMAS B. JONES.

REFERENCES CITED

The following references are of record in the file of this patent:

UNITED STATES PATENTS

| Number | Name | Date |
|---|---|---|
| 780,029 | Flegle | Jan. 17, 1905 |
| 1,081,837 | Jordan | Dec. 16, 1913 |
| 1,466,601 | Sanders | Aug. 28, 1923 |
| 2,062,718 | Kallberg | Dec. 1, 1936 |
| 2,176,250 | De Long | Oct. 17, 1939 |
| 2,327,789 | Hixon | Aug. 24, 1943 |
| 2,359,366 | Katcher et al. | Oct. 3, 1944 |